United States Patent [19]
Palanisamy et al.

[11] Patent Number: 5,708,347
[45] Date of Patent: Jan. 13, 1998

[54] METHOD FOR ACCELERATING THE DEPOLARIZATION OF A POLARIZED BATTERY TO FACILITATE BATTERY TESTING

[75] Inventors: Thirumalai Gounder Palanisamy, Morristown; John Anthony Hosty, Denville; Harmohan Narinjan Singh, Rockaway, all of N.J.

[73] Assignee: AlliedSignal Inc., Morristown, N.J.

[21] Appl. No.: 688,318

[22] Filed: Jul. 30, 1996

Related U.S. Application Data

[60] Provisional application No. 60/001,749 Aug. 1, 1995.
[51] Int. Cl.$^6$ .................................................. H01M 10/44
[52] U.S. Cl. .................................................. 320/13; 320/4
[58] Field of Search ........................................ 320/4, 13

[56] References Cited

U.S. PATENT DOCUMENTS

| | | | |
|---|---|---|---|
| 4,745,349 | 5/1988 | Palanisamy et al. | 320/22 |
| 4,829,225 | 5/1989 | Podrazhansky et al. | 320/14 |
| 4,876,495 | 10/1989 | Palanisamy et al. | 320/18 |
| 5,160,880 | 11/1992 | Palanisamy | 320/32 |
| 5,307,000 | 4/1994 | Podrazhansky et al. | 320/14 |
| 5,543,701 | 8/1996 | Leung et al. | 320/4 |
| 5,561,360 | 10/1996 | Ayres et al. | 320/14 |

*Primary Examiner*—Peter S. Wong
*Assistant Examiner*—Patrick B. Law
*Attorney, Agent, or Firm*—Verne E. Kreger, Jr.

[57] ABSTRACT

A method for depolarizing polarized batteries before determining the capacity of the battery by first discharging the polarized battery for a minimum time of about thirty seconds and under a current load of about 0.5 amps and then sensing the battery terminal voltage and discharging the battery again if the rate of change of the battery voltage exceeds 10 mV/30 seconds or the voltage to cell ration exceeds 2.13.

16 Claims, 2 Drawing Sheets

Change of a polarized battery terminal voltage with time during depolarization

Change of a polarized battery terminal voltage as a function of time

Change of a polarized battery terminal voltage with time during depolarization

METHOD FOR ACCELERATING THE DEPOLARIZATION OF A POLARIZED BATTERY TO FACILITATE BATTERY TESTING

REFERENCE TO RELATED APPLICATION

This application claims the benefit of U.S. Provisional Application No. 60/001,749, filed Aug. 1, 1995.

BACKGROUND OF THE INVENTION

This invention relates generally to rechargeable batteries, and more particularly to a method for identifying a polarized battery and accelerating the depolarization process of the polarized battery in order to facilitate battery testing.

Immediately after charging any rechargeable battery, especially a lead acid battery, to a value from generally about 80 percent to full capacity, the terminal voltage falls slowly to a steady-state value after removing the charge current. The observed declining terminal voltage is the result of the battery being polarized. Battery polarization is due to at least two reasons: 1) the adsorbed gas, such as hydrogen, generated during charging; and 2) the electrolyte concentration difference between the bulk portion of the plates and the pores of the plates. The latter arises because sulfuric acid is generated during the battery charging cycle.

Generally, polarized batteries tend to depolarize over a period of several hours. Depending on the severity of the polarization, the battery may take as long as 8 to 12 hours to depolarize. FIG. 1 graphically illustrates the battery voltage as a function of time, where the time axis is measured in hours.

Accordingly, there is a need to accelerate the depolarization of a polarized battery to allow for battery testing immediately after battery charging.

SUMMARY OF THE INVENTION

This invention provides for a method of first identifying a polarized battery and then providing a method for rapidly depolarizing the polarized battery. After depolarization, the battery is in the appropriate condition that will allow for accurate battery testing.

The method of depolarizing a polarized battery having a declining terminal voltage comprises discharging said polarized battery for a minimum time no less than thirty seconds; sensing said open circuit voltage; and repeating step (a) if said open circuit voltage continues to decline.

BRIEF DESCRIPTION OF THE DRAWINGS

The following detailed description, given by way of example, will be best understood in conjunction with the accompanying drawings in which.

DETAILED DESCRIPTION OF THE PREFERRED EMBODIMENT

The invention is useful for any rechargeable battery, such as lead acid, NiCd and NiMH to name a few. Additionally, this invention may be advantageously used in conjunction with the inventions disclosed in U.S. Pat. Nos. 4,745,349 "Apparatus and Method for Charging and Testing Batteries" to Palanisamy et al.; 4,876,495 "Apparatus and Method for Charging and Testing Batteries" to Palanisamy et al.; and 5,160,880 "Method and Apparatus for Charging and Testing Batteries" to Palanisamy, all of which are hereby incorporated by reference.

It is necessary to depolarize batteries under test before determining the capacity of a battery or running other tests to determine the health or characteristics of a battery. When the voltage of a battery exceeds 2.13 V/cell or the rate of change of the battery terminal voltage is greater than 10 mV/30 seconds then a battery is sufficiently polarized and must be depolarization before capacity or other tests may be performed on the battery.

Figure 1:
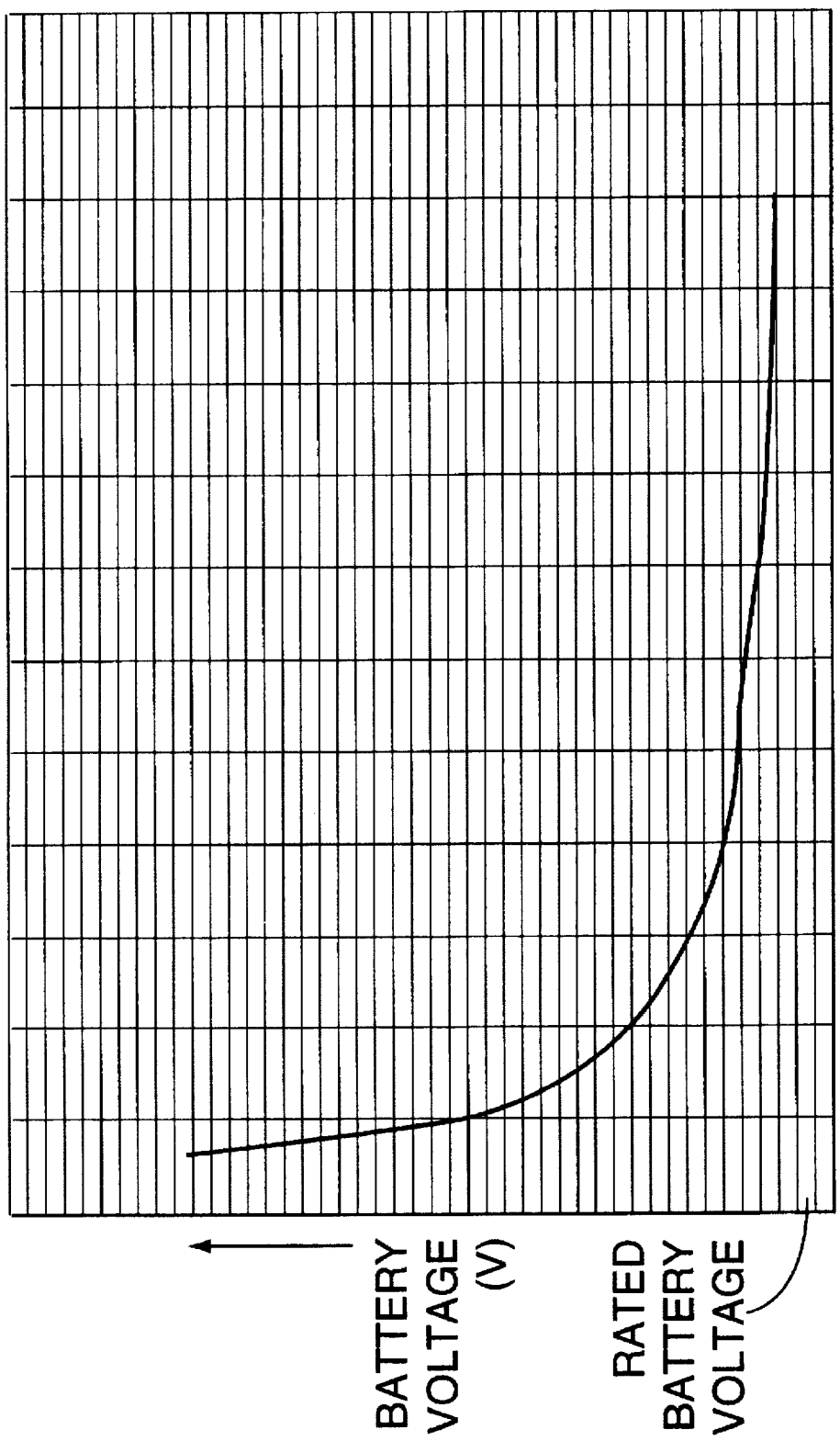
FIG. 1 is a graphical representation of the time required for a battery to reach a depolarized state.
Figure 2:
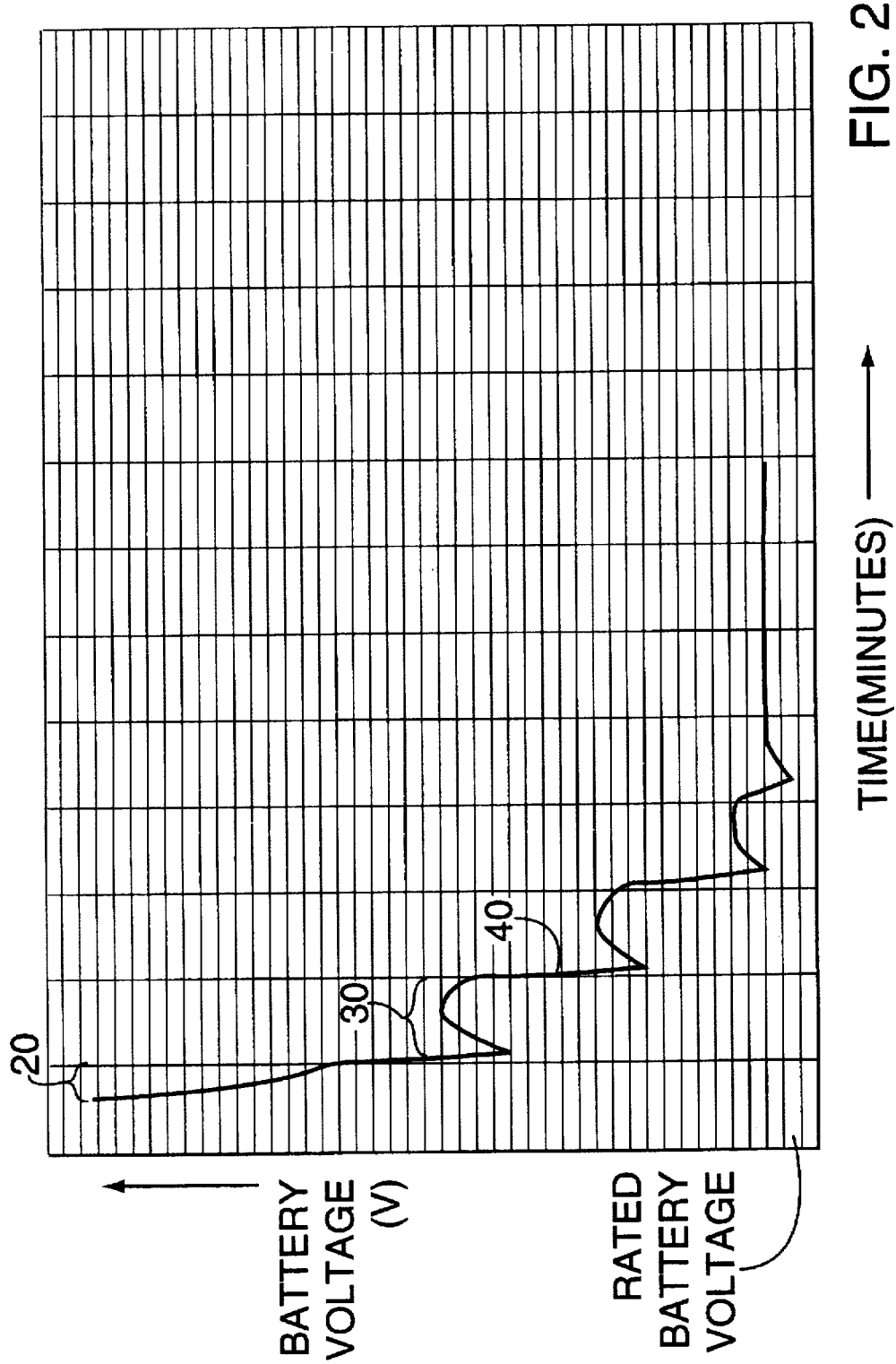
FIG. 2 is a graphical representation of the terminal voltage of a battery from a polarized to a depolarized state while subjected to the present invention.

Referring now to FIG. 2, a polarized battery is depolarized by first discharging the battery at a current load of generally from between about 0.5 to about 1.0 percent of the current capacity of a battery for a period of time 20 necessary to discharge the voltage resulting from the polarization or surface charge of the battery. Preferably, the discharge time is, at a minimum, thirty seconds. For example, the current discharge of a 100 Ampere-hour (Ahr) rated battery would be between 0.5 to 1.0 amps for a minimum of 30 seconds. The discharge time, however, should not exceed the time to discharge the useful energy stored in the battery plates. Alternatively, the discharge of the battery continues until the battery terminal voltage decreases by about 0.1 volts.

At the end of the discharge period the battery is placed in the open circuit state and the voltage is continuously monitored. If the battery is still polarized, the terminal voltage will immediately increase, go through a maximum and fall rapidly as shown in time span 30. The rate of the voltage increase indicates the severity of the battery polarization. If voltage change is greater than 10 mv/30 seconds, then a second discharge may be immediately applied to the battery 40. Alternatively, if the battery is not severely polarized, the battery may be placed in a relaxed state for a period of about 5 minutes before subjecting the battery to another discharge. The process of discharging the battery and optionally relaxing the battery in open circuit continues until the rate of change of battery open circuit voltage is less than 10 mV/30 seconds. At this point the battery is depolarized to go through the capacity (current ramp) test as disclosed in the incorporated references.

EXAMPLE

As a first step, the actual capacities of three different lead acid batteries were determined over three cycles. The average of the three cycles was taken as the capacity of each battery. The capacities of batteries one through three were: 24, 49 and 91 ampere-hours, respectively. The fully charged batteries were polarized to different degrees by subjecting each battery to charge voltages of 13.6, 13.8 and 14 volts for about 10 to 15 minutes. Detection of polarized batteries was accomplished using the rate of change of battery voltage and the magnitude of the voltage. By measuring the voltage of several fully charged polarized batteries and determining their capacity, we have found that when the battery voltage exceeds 2.13 V/cell the inaccuracy of capacity values exceeds an acceptable level. We also found that if the rate of change of battery voltage exceeds 10 mV in 30 seconds, then the capacity values as reported by the techniques disclosed in the incorporated references were not accurate.

The batteries were depolarized according to the disclosed method. After depolarization the current ramp test was run as discussed in detail in the incorporated references. The battery capacity was calculated using the current magnitude at which the battery starts to evolve gas during ramp up as disclosed in the incorporated references. The results are shown in Table 1.

TABLE 1

Determination of polarized battery capacity by current ramp method

| Nominal Voltage (Volts) | Nominal Capacity Ampere-Hour (Ahr) | Capacity by Discharge (Ah) | Capacity by Current Ramp After Depolarization (Ah) |
| --- | --- | --- | --- |
| 12 | 25 | 24 | 22 |
| 6 | 50 | 49 | 47 |
| 6 | 50 | 49 | 50 |
| 6 | 50 | 49 | 45 |
| 12 | 100 | 91 | 93 |
| 12 | 100 | 91 | 91 |

We claim:

1. A method for depolarizing a polarized battery having a declining open circuit voltage comprising the steps:
   a. discharging said polarized battery;
   b. sensing said open circuit voltage; and
   c. repeating step (a) if said open circuit voltage continues to decline above a minimum rate.

2. The method of claim 1 wherein step (a), said polarized battery is discharged for a minimum of thirty seconds.

3. The method of claim 1 wherein step (a) further comprises discharging said battery at a current load from between about 0.5 to about 1.0 percent of the current capacity of said battery.

4. The method of claim 3 wherein said current load is 0.5 amps.

5. The method of claim 1 wherein said minimum rate is 10 mV/30 seconds.

6. The method of claim 1 wherein step (c) further comprises waiting for a period of time of about five minutes before repeating step (a).

7. The method of claim 1 wherein said battery is a lead acid battery.

8. A method for depolarizing a polarized battery having a declining open circuit voltage comprising the steps:
   a. discharging said polarized battery until said open circuit voltage decreases an amount of no less than 0.1 volts;
   b. sensing said open circuit voltage; and
   c. repeating step (a) if said open circuit voltage continues to decline above a minimum rate.

9. The method of claim 8 wherein said minimum rate is 10 mV/30 seconds.

10. The method of claim 8 wherein step (c) further comprises waiting for a period of time of about five minutes before repeating step (a).

11. A method for depolarizing a polarized battery having an open circuit voltage that exceeds a minimum voltage to cell ratio comprising the steps:
    a. discharging said polarized battery;
    b. sensing said open circuit voltage; and
    c. repeating step (a) if said voltage to cell ratio exceeds said minimum voltage to cell ratio.

12. The method of claim 11 wherein step (a), said polarized battery is discharged for a minimum of thirty seconds.

13. The method of claim 11 wherein step (a) further comprises discharging said battery at a current load from between about 0.5 to about 1.0 percent of the current capacity of said battery.

14. The method of claim 13 wherein said current load is 0.5 amps.

15. The method of claim 11 wherein said minimum voltage to cell ratio is 2.13.

16. A method for depolarizing a polarized battery comprising the steps:
    a. discharging said polarized battery;
    b. sensing a maximum peak open circuit voltage; and
    c. repeating step (a) if said maximum peak open circuit voltage is greater than a predetermined minimum open circuit voltage.

* * * * *